United States Patent
Arnal et al.

(10) Patent No.: US 10,601,602 B2
(45) Date of Patent: Mar. 24, 2020

(54) HYBRID DATA TRANSPORT SOLUTION, IN PARTICULAR FOR SATELLITE LINKS

(71) Applicant: THALES, Courbevoie (FR)

(72) Inventors: Fabrice Arnal, Cugnaux (FR); Cédric Baudoin, Toulouse (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 15/910,243

(22) Filed: Mar. 2, 2018

(65) Prior Publication Data
US 2018/0254911 A1 Sep. 6, 2018

(30) Foreign Application Priority Data
Mar. 2, 2017 (FR) .................... 17 00204

(51) Int. Cl.
*H04L 12/18* (2006.01)
*H04L 5/00* (2006.01)
(Continued)

(52) U.S. Cl.
CPC ....... *H04L 12/189* (2013.01); *H04B 7/18502* (2013.01); *H04L 1/16* (2013.01);
(Continued)

(58) Field of Classification Search
CPC ....... H04L 69/16; H04L 45/24; H04L 47/125; H04L 47/193; H04L 12/189; H04L 1/18;
(Continued)

(56) References Cited

U.S. PATENT DOCUMENTS

| | | | |
|---|---|---|---|
| 2009/0172801 A1* | 7/2009 | Friedrich | H04L 29/12066 726/12 |
| 2013/0077501 A1* | 3/2013 | Krishnaswamy | H04L 47/193 370/252 |

(Continued)

FOREIGN PATENT DOCUMENTS

CN 105 049 369 A 11/2015

OTHER PUBLICATIONS

A. Balasubramanian et al.,"Detecting Shared Congested Router for Mobile Communication Using Multiple-Interface Devices," 2015 IEEE Global Communications Conference, Dec. 6, 2015, pp. 1-6, XP032872615.

(Continued)

*Primary Examiner* — Rownak Islam
(74) *Attorney, Agent, or Firm* — Baker & Hostetler LLP

(57) ABSTRACT

A method is provided for exchanging data flows between two terminals, via a multipath link formed of a plurality of transmission channels at least one of the channels of which is a unidirectional channel. The method implements two interface modules operating in transmission mode or in reception mode, respectively. In transmission mode, an interface module separates the transmitted data flow into a plurality of secondary data flows and transits them via the plurality of transmission channels. In reception mode, it reassembles the received secondary data flows into a single data flow. The interface modules route the acknowledgement information of the data packets transiting via a unidirectional channel via the return path of a bidirectional channel.

5 Claims, 5 Drawing Sheets

(51) Int. Cl.
*H04W 8/26* (2009.01)
*H04L 29/08* (2006.01)
*H04W 92/00* (2009.01)
*H04L 12/707* (2013.01)
*H04L 1/16* (2006.01)
*H04B 7/185* (2006.01)
*H04L 12/801* (2013.01)
*H04L 12/803* (2013.01)
*H04L 29/06* (2006.01)

(52) U.S. Cl.
CPC ............ *H04L 5/0037* (2013.01); *H04L 45/24* (2013.01); *H04L 67/04* (2013.01); *H04W 8/26* (2013.01); *H04W 92/00* (2013.01); *H04L 47/125* (2013.01); *H04L 47/193* (2013.01); *H04L 69/16* (2013.01)

(58) Field of Classification Search
CPC ......... H04L 5/0037; H04L 67/04; H04L 1/16; H04W 8/26; H04W 92/00; H04B 7/18502
USPC ....................................................... 370/312
See application file for complete search history.

(56) References Cited

U.S. PATENT DOCUMENTS

2016/0277247 A1* 9/2016 Kim .................... H04L 41/0826
2018/0234335 A1* 8/2018 Sridhar ................ H04L 47/193

OTHER PUBLICATIONS

X. Chen et al., "Performance Guaranteed Routing Protocols for Asymmetric Sensor Networks," IEEE Transactions on Emerging Topics in Computing, vol. 1, No. 1, Jun. 1, 2013, pp. 111-120, XP011527603.

* cited by examiner

HYBRID DATA TRANSPORT SOLUTION, IN PARTICULAR FOR SATELLITE LINKS

CROSS-REFERENCE TO RELATED APPLICATIONS

This application claims priority to foreign French patent application No. FR 1700204, filed on Mar. 2, 2017, the disclosure of which is incorporated by reference in its entirety.

FIELD OF THE INVENTION

The invention relates to the field of telecommunications, and in particular to satellite telecommunications.

It relates to 'multipath' communication means for optimally utilizing a plurality of communication channels simultaneously (i.e. controlled in real-time).

It pertains more particularly to communication systems utilizing the resources of at least two transmission channels, one of these, which is called unidirectional channel in following description, having no return path.

BACKGROUND

In the context of current communication systems, one significant problem to be solved lies in the increasing size of the throughputs of information that these systems have to support. Specifically, communication networks are made available to subscriber users, who generally use them as they wish and completely asynchronously, such that, when the throughput required on one branch of a communication network is too high, the network is saturated resulting in a slowdown of the data exchanges, possibly accompanied by losses of information packets.

This phenomenon is particularly sensitive in the context of data exchanges via the Internet on account of the increase in the number of connections to the network and the increasingly large size of the data exchanged between the users subscribed to the network and the data exchanged between the users ('clients') and remote information storage zones or databases ('servers').

One solution that is contemplated for dealing with this increase consists in simultaneously using two or more separate communication channels that the user may have available on his terminal to transmit or receive the desired information.

In the context of the Internet, such a solution involves developing the existing data exchange protocol, the TCP protocol, such that the latter is capable of simultaneously managing data flows (reference is made to 'subflows') flowing through various channels and intended to be linked together so as to form a single data flow at the user end, which data flow is intended to supply a given application that is implemented by this user (data storage in a remote storage centre or reading video files that are transmitted via a remote broadcasting platform, for example).

This development of the TCP protocol has given rise to the MP-TCP protocol, which is in the process of being standardized. This improved protocol in particular has the advantage of impacting only the transport layer of the communication network under consideration.

'MP-TCP' constitutes an extension of the 'TCP' standard transport protocol that makes it possible to add what are termed 'multipath' ('MP') capabilities to this protocol.

One typical case in which the 'MP-TCP' protocol is implemented, as is able to be contemplated at the present time, is that of smartphones. Smartphones are typically devices that are provided with 2 network access interfaces: an interface with mobile telephony networks, with the 3G/4G standards for example, and a Wi-Fi™ interface with an Internet terminal ('set top box' or simply 'box').

FIG. 1 illustrates the principle of use of two separate Internet access mechanisms using the MP-TCP protocol, taking, as a typical exemplary application, the application to smartphones.

In such a hardware configuration, the 'MP-TCP' protocol enables utilization of the two networks (3G/4G and Wi-Fi™) to download or read data from one and the same server, as long as the latter supports this protocol, by combining the capabilities of the two networks to provide one and the same overall transport service from the point of view of the application.

In this case, the data take 2 physically different paths (in an unbroken line and in a dashed line in FIG. 1) that are predetermined depending on the IP addresses of the clients and servers.

These paths may possibly take a shared section, as illustrated in FIG. 1, between one of the routers of the network and the TCP server, this router not having any particular functionality.

It is recalled at this juncture that a protocol of MP-TCP type thus makes it possible to create and manage secondary data flows ('subflows') that are associated with interface/address pairs that are different, but that are also partly or completely identical.

The integration of the multipath functionality into a conventional TCP protocol naturally assumes various developments.

In particular, it assumes the integration of a dedicated software layer located below the interface layer to the application, which for its part remains unchanged. Only the software implementation (typically in the kernel of the OS or 'operating system') is slightly different in practice.

Functionally, this implementation is managed in the TCP client/server software stack by providing two sublayers: the MP-TCP sublayer, strictly speaking, which is aware of all of the secondary data flows ('subflows'), and the 'subflow' sublayer, which is simply the local implementation of a conventional TCP connection (i.e. not 'MP') with the IP interface of each of the channels conveying the secondary data flows ('subflows').

Integrating the multipath ('MP') functionality also assumes specific signalling and message creation that enable an MP-TCP-compatible machine to determine whether its correspondent is MP-TCP-compatible, to be informed that a local interface of a host is available for 'multipath' communication, and then to create 'subflows' as such.

Integrating the multipath functionality into a conventional TCP protocol however remains an advantageous solution in that it makes it possible to preserve virtually all of the pre-existing hardware and software infrastructures.

The set of rules governing the implementation and utilization of MP-TCP links forms the subject of the document 'request for comments' RFC6824, which describes the technical aspects of the MP-TCP protocol.

The solution consisting in implementing an MP-TCP protocol to increase the data transfer throughput on a network, in particular the Internet, therefore requires having a plurality of available transmission channels through which the data packets are transited in a plurality of flows that are recombined on arrival so as to reproduce the expected data frame.

However, each channel is supposed to be able to support bidirectional exchanges (data and protocol) between transmitter and receiver, one path ('outward' path) being dedicated to the transfer of data from the transmitter to the receiver, while another path ('return' path) is dedicated to the transfer of acknowledgement information between the receiver receiving the data and the transmitter. This acknowledgement information is necessary for controlling congestion on the network path under consideration and for increasing reliability of the transfer so as to trigger retransmissions when this proves necessary.

Now, it should be noted that, with regard to transferring data via satellite for use by the general public, two separate types of link are generally available: bidirectional links that enable communications of 'broadband' type, and unidirectional links that enable communications of 'broadcast' type, the second type of link being much more widespread at the present time.

Therefore, in the context of a transmission of data via satellite in accordance with a TCP protocol, it is not always possible to increase the data transmission throughput by implementing an MP-TCP protocol, which protocol assumes that a plurality of transmission channels are available and requires, like the TCP protocol, the implementation of bidirectional data flows.

In particular, in the context of data links involving a plurality of satellite channels, implementing links following an MP-TCP protocol does not always constitute, at the present time, a solution that is able to be contemplated for increasing the throughput, due to the lack of a sufficient number of available bidirectional data links. The problem arises since the lack of a sufficient number of return paths prevents the effective multipath transport solutions, such as MP-TCP, from being able to be deployed in this context. Specifically, the receipt acknowledgements ('ACK' signals) that make it possible, by detecting packet losses, to determine the congestion level and congestion events in order for the data transmitter to take the necessary actions, are transported and signalled via the return path.

To solve this problem that is inherent to satellite links, asymmetric and unidirectional routing methods (such as the UDLR ('UniDirectional Link Routing') solution) have been envisaged, in particular implementing a unidirectional satellite link that is coupled to a terrestrial return path.

However, such a solution proves not to be completely suitable for the problem. Specifically, in so far as it is generally implemented at the routing layer (layer 3), possible congestion that may arise separately on each of the two paths is not able to be taken into account overall.

Moreover, in order to at least partially solve this problem, 'smart router' solutions are commercially available, these performing load sharing at the data packet transmission level by implementing various distribution algorithms. However, these devices are not able to work at the transport layer level and are therefore not able to make effective decisions that are able to be applied to 'standard' interfaces with the network. Worse still, in the case of applications using the MP-TCP protocol, the 'smart router' could make incoherent routing decisions that are incompatible with the MP-TCP protocol.

What is more, in addition to these load sharing solutions and 'multihoming' functions (i.e. simultaneous connection to a plurality of networks) that are implemented at the transport layer level, mention may also be made of the implementation of PEP-TCP (PEP for 'Performance Enhancement Proxy') functions. This type of function advantageously makes it possible to avoid, to a certain extent, possible congestion that may arise on a data link, in particular in the case of using a satellite transmission channel.

Lastly, a partial solution to this problem may also consist of a data transmission system implementing the MP-TCP protocol between PEPs at a satellite gateway (or 'GW') and satellite terminals.

SUMMARY OF THE INVENTION

One aim of the invention is to propose a solution that makes it possible to form bidirectional data links by using various transmission channels, so as to convey data packets in the form of secondary data flows, each secondary flow transiting via a given transmission channel.

Another aim of the invention is to propose a solution that makes it possible to optimize the transmission of data flows in the form of secondary data flows transiting in parallel, by using both bidirectional transmission channels and unidirectional transmission channels.

To this end, one subject of the invention, according to a first aspect, is a method for exchanging data flows between two terminals, a server terminal providing data to a client terminal, by way of a multipath link formed of a plurality of transmission channels at least one of the channels of which is a unidirectional channel, said data flow containing data transmitted from the server terminal to the client terminal and also acknowledgement information transmitted in the same flow from the client terminal to the server terminal.

The method according to the invention implements an interface module dedicated to transmitting the data forming said data flow, separating said data flow into a plurality of secondary data flows and transiting said secondary data flows via said plurality of transmission channels forming the multipath link.

It also implements an interface module dedicated to receiving said data, receiving the data forming the secondary data flows transmitted via said plurality of channels and reassembling said secondary data flows into a single data flow.

According to the invention, the interface modules are furthermore configured to route the acknowledgement information of the data packets forming a secondary data flow transiting via a unidirectional channel by associating it with the acknowledgement information of the data packets forming a secondary data flow transiting via a bidirectional channel.

According to various particular provisions that may be considered separately or in combination with one another, the device may have various additional features. Thus:

According to a first feature, with the protocol for exchanging data between the two terminals being a TCP protocol, each interface module is configured to perform a TCP/MPTCP interface function that makes it possible to transit the TCP data flow under consideration via the multipath link, in the form of secondary data flows, each secondary flow being in accordance with the MP-TCP protocol.

According to another feature, in this same context, an interface module, in transmission mode, is configured in such a way as to simultaneously provide:
- a 'TCP interface' function that manages the data flow exchanges with the terminal under consideration;
- a 'TCP/MP-TCP adaptation' function that separates the data flow, in the TCP format, into a plurality of secondary data flows in the MP-TCP format;
- an 'asymmetric routing' function that makes it possible to manage the routing, via a bidirectional channel, of the acknowledgement information packets accompanying the data packets forming a secondary data flow intended to transit via a unidirectional channel.

According to another feature, in this same context, the asymmetric routing function is provided, in transmission mode, by an interface module that identifies the secondary data flow(s) formed from a single data flow and intended to transit via a unidirectional channel, and marks the acknowledgement information forming the latter before integrating the latter into a data flow intended to transit via a bidirectional channel.

According to another feature, in this same context, an interface module, in reception mode, is configured in such a way as to simultaneously provide:
- a 'TCP interface' function that manages the data flow exchanges with the terminal under consideration;
- a 'TCP/MP-TCP adaptation' function that reproduces a single data flow in the TCP format from the data forming the received secondary data flows;
- an 'asymmetric routing' function that makes it possible to recover the acknowledgement information packets relating to the data packets forming a secondary data flow that has transited via a unidirectional channel and to reassociate the data with the corresponding acknowledgement information.

According to another feature, in this same context, the asymmetric routing function is provided, in reception mode, by an interface module that identifies the marked acknowledgement information and reassociates this information with the data forming the secondary data flow that has transited via the corresponding unidirectional channel.

According to another feature of the invention, the interface elements are integrated into PEP servers, located at the output of the terminals under consideration and responsible for managing and optimizing the throughput of the exchanged data so as to avoid saturation of the link and the recurrent loss of data packets.

According to another feature, in this same context in which the protocol for exchanging data between the two terminals is a TCP protocol, with the 'TCP interface' and 'TCP/MP-TCP adaptation' functions of the interface module in transmission mode being integrated into a PEP server located at the output of the server terminal and the 'TCP interface' and 'MP-TCP/TCP adaptation' functions of the interface module in reception mode being integrated into a PEP server located at the output of the client terminal, the respective 'asymmetric routing' functions are situated in additional interface machines of router or switch type that are located at the output of the PEP servers.

Another subject of the invention, according to a second aspect, is the implementation of the method according to the invention in order to exchange data flows between two terminals, by way of a multipath link formed of a plurality of satellite transmission channels at least one of the channels of which is a unidirectional channel providing links of broadcast type.

Advantageously, the method according to the invention makes it possible to develop a multipath network architecture compatible with MP-TCP operation, with one of the paths, in other words one of the data links utilized, being unidirectional. To transport the receipt acknowledgements (ACKs) corresponding to the absent return path, the return path of the other system is employed, by applying specific routing rules to the components where the network paths are shared.

BRIEF DESCRIPTION OF THE DRAWINGS

The features and advantages of the invention will be better appreciated by virtue of the following description, which description draws on the appended figures, in which.

DETAILED DESCRIPTION

In the following text, for the sake of simplifying the explanation, the method according to the invention is presented through an exemplary application relating to the establishment of a multipath data link between two terminals connected to the Internet by way of a network infrastructure including two satellite communication channels, one of which is a unidirectional channel (i.e. a channel without any return path). This particular example, which makes it possible to highlight the advantageous technical features of the device according to the invention, is of course not intended to limit the scope or the range of the invention to this single case of application.

In particular, the use of the method according to the invention is not limited to the case of an Internet infrastructure and the TCP protocol alone, but may be broadened to network infrastructures including a plurality of accessible communication channels, these channels all being bidirectional channels or some of these channels being only unidirectional.

Likewise, the method according to the invention may be implemented in any type of network infrastructure with at least 2 access link, one being bidirectional and the other unidirectional (such as broadcast/multicast).

Figure 1:
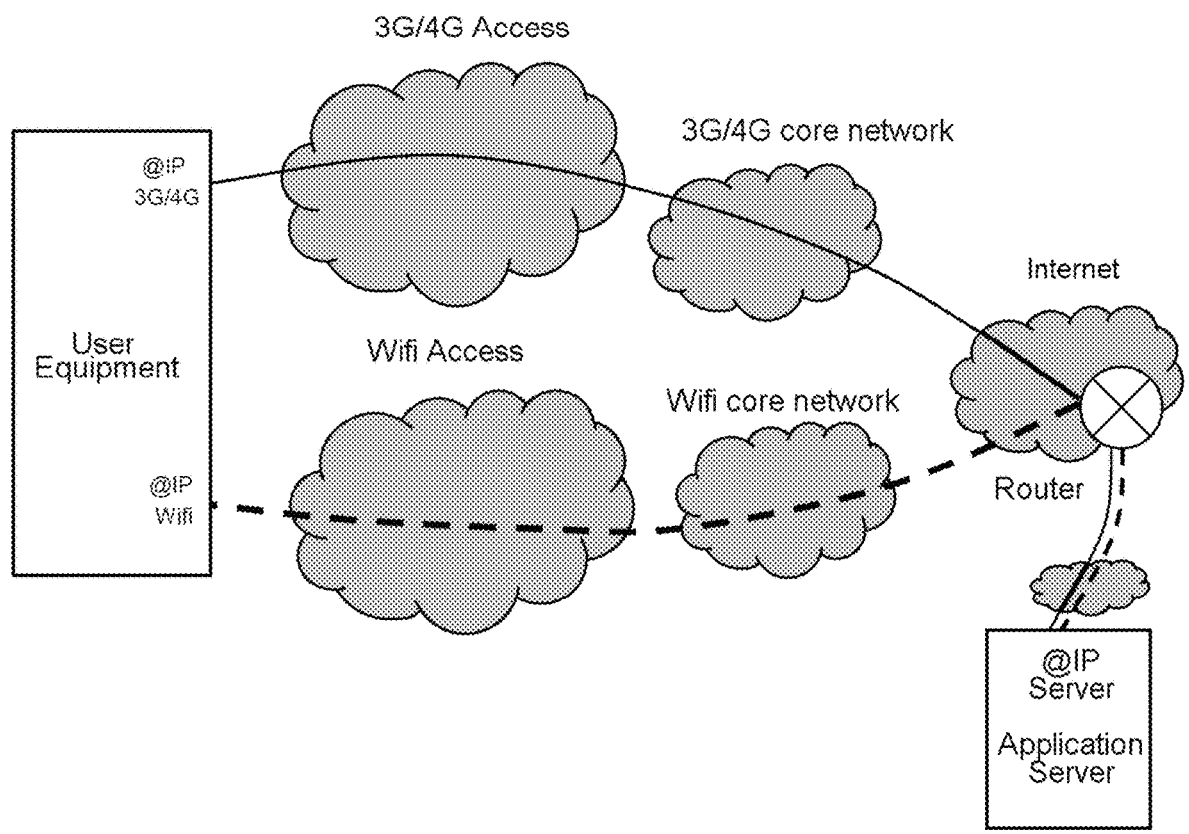
FIG. 1 shows an illustration relating to the context of hybrid data transport, calling on a plurality of communication channels.
Figure 2:
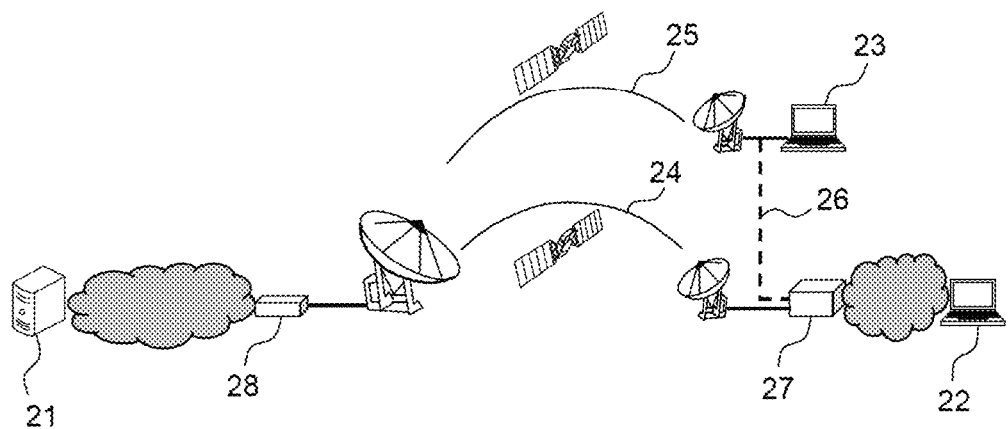
FIG. 2 shows an exemplary hardware configuration in which the method according to the invention is able to be implemented.

The combination can thus be:
a satellite and a terrestrial channel
two satellite channels
two terrestrial channels FIG. 2 illustrates an exemplary network infrastructure using satellite channels to establish Internet communication between a terminal 21 providing services such as the provision of video-on-demand files, and user terminals 22 and 23 able to access the services. In the infrastructure presented in FIG. 2, two satellite channels 24 and 25 are available, one 24 of which enables bidirectional communication of broadband type and the other 25 enables only unidirectional communication of broadcast type. The satellite data is in this case received either directly (broadcast mode) or by way of PEPs 27 (broadband mode) intended in particular to optimize the data transfer throughput. These two channels used in this case to transmit data to two different terminals 22 and 23 are however not able to be used as such for multipath transmission, from the provider terminal 21 to the user terminal 22 for example. Specifically, in such a structure, the terminal 23 is only able to receive data from the provider terminal and is not able to transfer any acknowledgement information in return such that, if the data packets transmitted by the provider terminal 21 are altered during the transfer, the user terminal 23 does not have any possibility of informing the transmitter thereof, such that the altered data are definitively lost.

Therefore, as it stands, using the unidirectional communication channel 25, as illustrated by the dashed line 26, to create a multipath link between the provider terminal 21 and the single user terminal 22, in the context of a data exchange protocol of TCP type for example, proves impossible even if the user or 'client' terminal 22 and the provider or 'server' terminal 21 are able to be configured to exchange data via a multichannel link by way of multipath interfaces 27 and 28.

Figure 3:
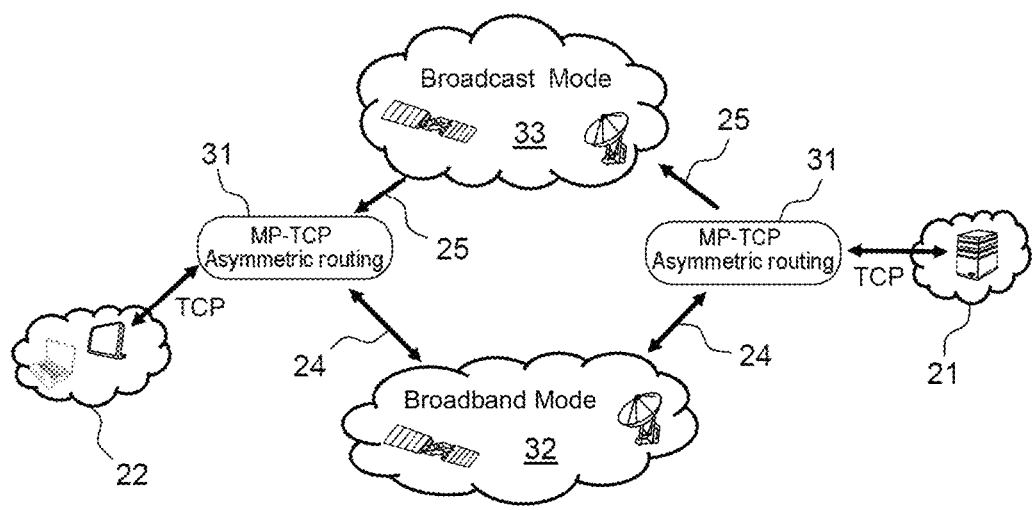
FIG. 3 shows an illustration of the principle for implementing the method according to the invention.

Advantageously, as FIG. 3 illustrates, this impossibility is able to be removed by implementing the method according to the invention 31, upstream and downstream of the hybrid communication channel used. The term 'hybrid channel' is understood to mean a channel including one or more unidirectional paths and one or more bidirectional paths. In the case of using satellite channels, a hybrid channel is formed for example of a satellite link 33 of broadcast type and of a satellite link 32 of broadband type.

Figure 4:
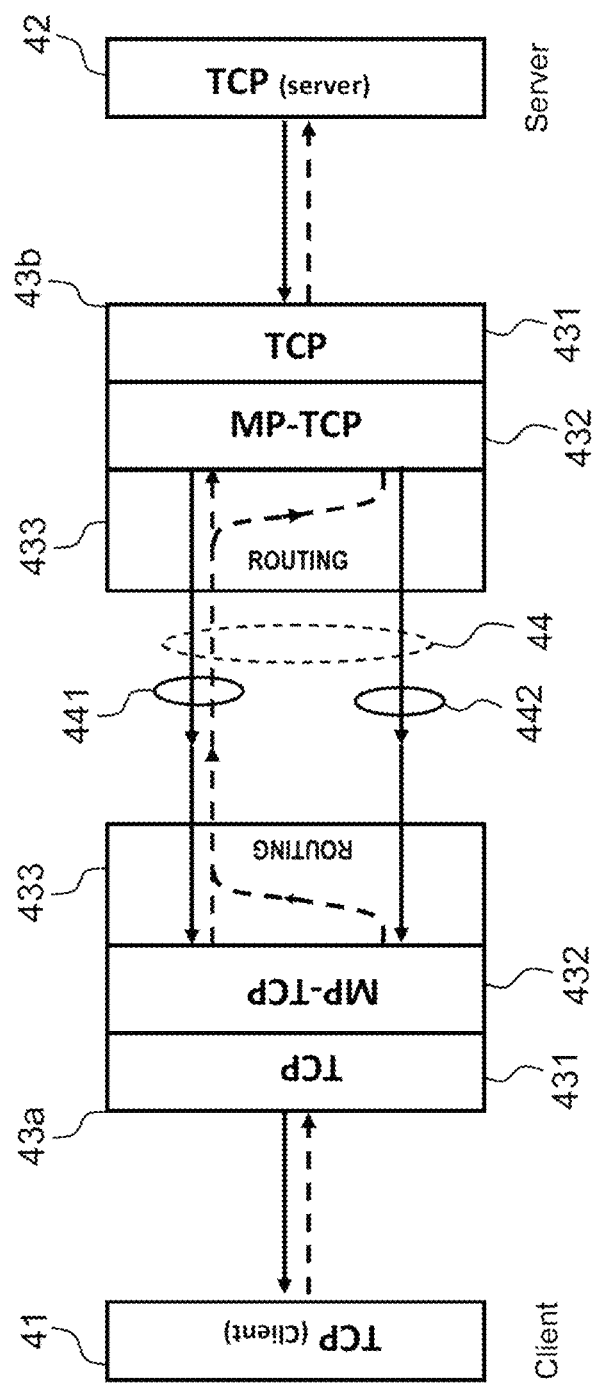
FIG. 4 shows a diagram illustrating the main components of the method according to the invention.

FIG. 4 illustrates the general functional structure of the multipath data transfer method according to the invention, in the context, taken by way of example, of the transmission of data from a server terminal 42 to a client terminal 41 following a TCP protocol. The data transfer is presented in this case as being performed via two communication channels, a bidirectional channel 441 and a unidirectional channel 442. However, it will appear clearly, upon reading the following paragraphs, that the described structure may easily be generalized so as to provide a data transfer via a plurality of communication channels forming a multipath channel 44.

The functional structure of the method according to the invention primarily implements two interface elements 43a and 43b that are interposed between the terminals 41 and 42 under consideration and the communication network 44 linking the two terminals. For a given data transfer sequence, the interface element 43a in communication with the client terminal 41, that is to say with the terminal receiving the data, operates in reception mode, while the interface element 43b in communication with the server terminal 42, that is to say with the terminal transmitting the data, operates in transmission mode.

Each interface element 43a or 43b generally simultaneously provides a 'TCP interface' function 431, a 'TCP/MP-TCP adaptation' function 432 and an 'asymmetric routing' function 433. The two interface elements 43a and 43b implement these various functions symmetrically.

The 'TCP interface' function 431 is intended, in a known manner, to enable the exchange of data flows with the terminal to which the interface element under consideration, 43a or 43b, is linked. This function advantageously makes it possible to implement the method according to the invention without having to modify the existing server terminal 42 and client terminal 41, which are thus able to continue to exchange data following the pre-existing TCP protocol.

The 'TCP/MP-TCP adaptation' function 432, in reception mode, that is to say in the case of the interface element 43a, separates the data flow, in the TCP format, received from the server terminal 41, into a plurality of secondary data flows.

By contrast, in transmission mode, that is to say in the case of the interface element 43b, said function recombines the data, in the MP-TCP format, coming from the various communication channels, into a single data flow in the TCP format.

The MP-TCP protocol, which is known per se, assumes that the communication channels via which the various secondary data flows transit do not have a return path that enables the recipient to transmit the acknowledgement information relating to the received data. Now, as FIG. 4 illustrates, some channels that are utilized, such as the channel 442, are unidirectional channels, that is to say without a return path.

Therefore, in order to overcome this lack of a return path and enable utilization of unidirectional channels, each interface element 43a or 43b of the device according to the invention is provided with an asymmetric routing function.

The 'asymmetric routing' function 433 according to the invention advantageously makes it possible to take account of the use of unidirectional transmission channels, channels that are utilized to transmit data in broadcast mode for example, and to take account of possible saturations of the secondary data flows transiting via these channels. By creating an artificial return path, the 'asymmetric routing' function 433 advantageously makes it possible to secure the data exchange via a unidirectional communication channel.

From a functional point of view, in reception mode, that is to say in the case of the interface element 43a, the 'asymmetric routing' function 433 redirects the acknowledgement information relating to the data that transit via the unidirectional channel 432 to the return path of the bidirectional channel 441.

By contrast, in transmission mode, that is to say in the case of the interface element 43b, the 'asymmetric routing' function 433 reassociates the flow of acknowledgement information relating to the data transmitted via the unidirectional channel 442 with the secondary data flow transmitted via the unidirectional channel 441 so as to reform an MP-TCP secondary data flow.

From a hardware point of view, the method according to the invention is able to be implemented in various ways. The various functions that it performs, which are described in the above text, may for example be implemented at the interface components of PEP or 'Performance Enhancement Proxy' type. These devices are generally interposed, in the context in particular of the utilization of satellite communication channels, between the terminal under consideration and the communication network. They take on in particular the role of buffer memories, and make it possible to 'speed up' or to regulate the fluidity of the data transfer, which data are transmitted or received by the terminal under consideration.

From a functional point of view, depending on whether the terminal under consideration performs a server-type function or a client-type function, a PEP normally takes on, with respect to the latter, the role of a client terminal or of a server terminal. Conversely, with respect to the network, it takes on the role of client or of server. A PEP therefore itself performs a TCP interface function such as the function 431.

Therefore, in such a context, one economically advantageous solution for implementing the method according to the invention advantageously consists in modifying the software structure of the PEP under consideration so as to equip the latter with a 'TCP/MP-TCP adaptation' function such as the function 432, and also with an 'asymmetric routing' function such as the function 433.

These two functions may thus be integrated as additional routines into the software structure implemented by an existing item of hardware, such that the implementation of the device according to the invention does not require any additional hardware.

What is thus advantageously obtained is a multipath PEP structure capable of taking charge of the data flows transiting via various channels, some of which channels may be unidirectional, such that the utilization of a plurality of channels is transparent for the user terminals.

The asymmetric routing function constitutes, together with the TCP interface and TCP/MP-TCP adaptation functions, the characteristic element of the device according to the invention. According to the hardware and/or software configuration that is contemplated, this function, illustrated by FIGS. 3 and 4, may be implemented in various ways.

In the context of a structure including multipath PEP servers, the asymmetric routing function may thus be installed within the software implementation of the multipath PEP stack itself, by modifying the input and output IP addresses for the data packets, after they have been separated into various secondary data flows.

As an alternative, it may be installed in the machine implementing a multipath PEP function as a separate software component acting on the IP stack through which the Internet protocol is managed.

As another alternative, it may be installed on a separate machine interposed between the communication network (i.e. the various channels that are utilized) and the machine implementing the multipath PEP function.

From a functional point of view, the function of the asymmetric routing, as stated above, is to detect the flow of acknowledgement information transmitted by the client terminal and relating to the data that have transited via a unidirectional channel, and to transit this information via the return path of one of the bidirectional channels that is implemented. Thus, in the example of FIG. 4, the asymmetric routing function will ensure that the acknowledgement information relating to the channel 442 transits via the return path of the bidirectional channel 441.

This asymmetric routing may be implemented in various ways.

One direct (and preferred) implementation consists for example in manipulating the rules of the local routing table that identifies the data packets so as to redirect certain data packets when necessary.

Figure 5:
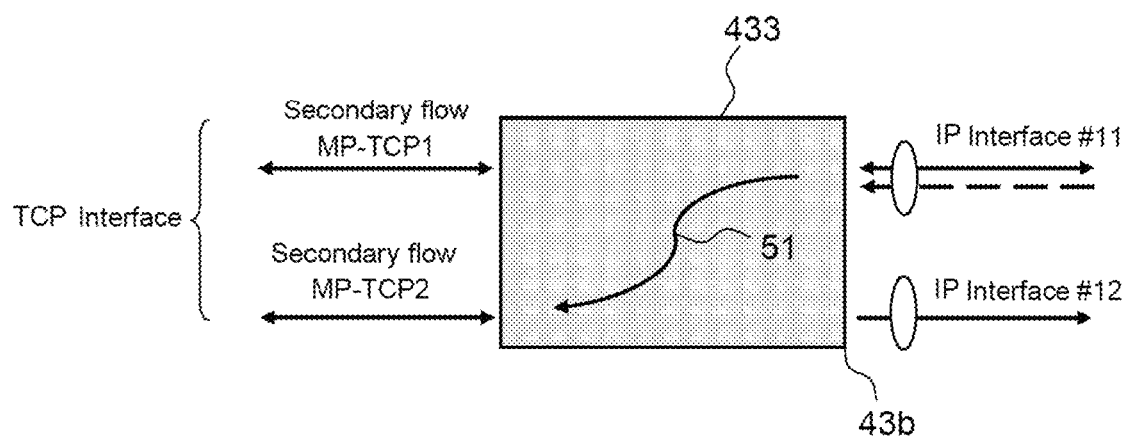
FIGS. 5 and 6 show functional diagrams illustrating the asymmetric routing principle implemented by the method according to the invention.

Thus, as FIG. 5 illustrates, in the case of the transmitter PEP 43*b* linked to the server terminal 42, the functions of the asymmetric routing 433 will be to:
- detect, on the bidirectional channel in question (IP Interface #11), the flow of acknowledgement information corresponding to the data of the secondary data flow that has been transmitted via the unidirectional channel (IP Interface #12);
- mark these acknowledgement information packets;
- route 51 the thus-marked packets to the generic address corresponding to the secondary data flow transmitted via the unidirectional channel (secondary flow 2).

Figure 6:
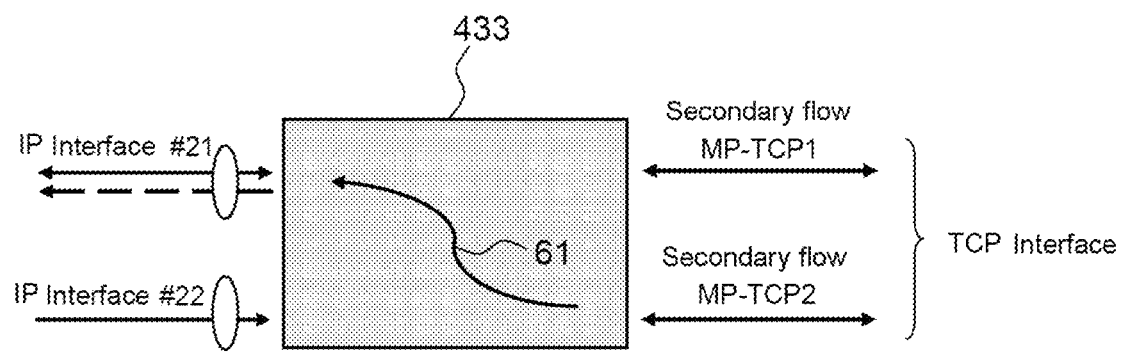

Conversely, as FIG. 6 illustrates, in the case of the receiver PEP 43*a* linked to the client terminal 41, the functions of the asymmetric routing 433 will be to:
- detect the flow of acknowledgement information associated with the secondary data flow received via the unidirectional channel (IP Interface #22);
- mark these acknowledgement information packets;
- route 61 these packets to the bidirectional channel in question (IP Interface #21).

This direct implementation constitutes an advantageous embodiment as it is simple from a functional point of view.

However, it may introduce network constraints, in particular when, in the case of a transmission via satellite channels, there are other intermediate switching devices, of router or switch type, located between the PEPs and the satellite transmission devices. The packets associated with a physical port will mandatorily have to include the expected destination address for this interface, or they will not be routed (i.e. they will be rejected).

Nevertheless, in such circumstances, an alternative solution may be contemplated, which consists:
- on the side of the receiver PEP 43*a*, in encapsulating, at the asymmetric routing level, the acknowledgement information packet containing the destination IP address (IP Interface #11) in an IP packet of a second level (IP in IP encapsulation), including the address IP Interface #1 of the intermediate device as external destination address. The packet may thus be routed as far as the final receiver PEP.
- on the side of the transmitter PEP 43*b*, in extracting the internal IP data packet, and then in routing it in a usual manner.

As has been described above, the method according to the invention makes it possible to establish a data exchange between two terminals, via a bidirectional exchange protocol with generation and transfer of acknowledgement information on the part of the transmitter terminal to the receiver terminal, by using bidirectional data transmission channels and unidirectional channels. This use advantageously makes it possible, in particular in the case of a satellite communication network, to substantially increase the throughput of the information transmitted.

Figure 7:
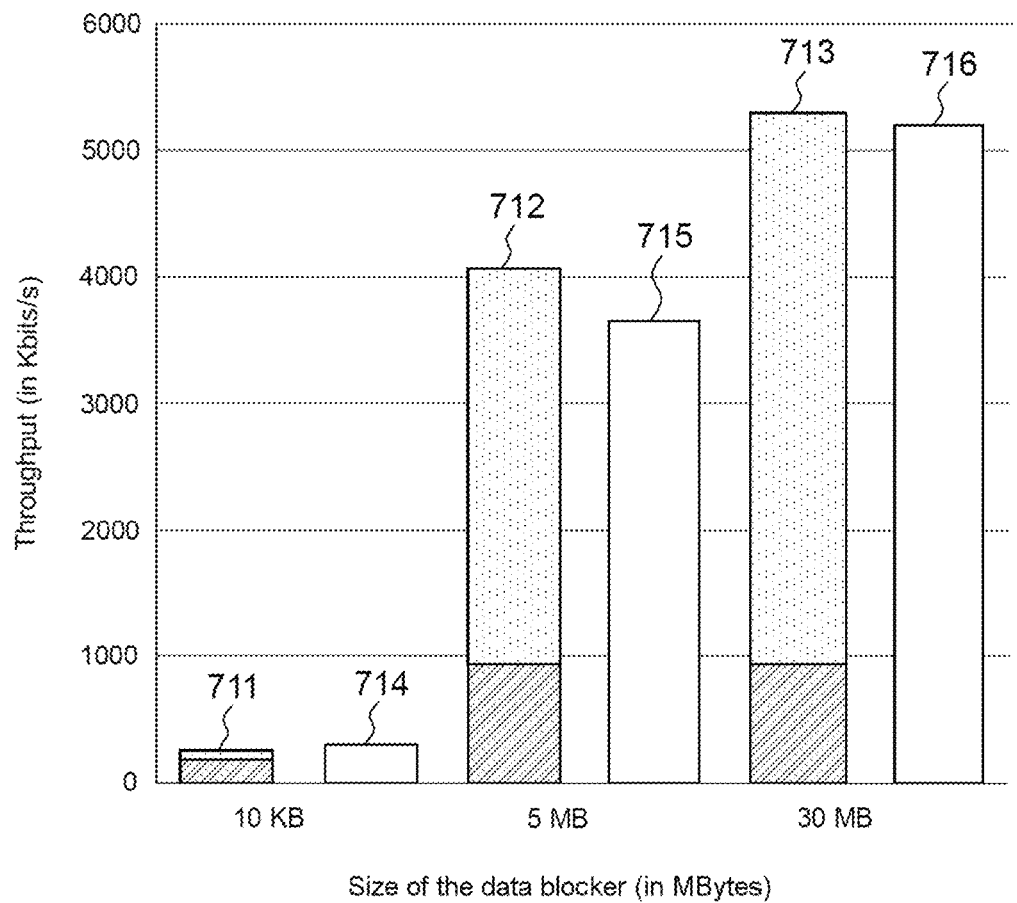
FIG. 7 shows a graph illustrating the performances, in terms of throughput, obtained by implementing the method according to the invention.

FIG. 7 illustrates the result obtained by implementing the method according to the invention in the context, taken by way of example, of a simplified structure creating a direct end-to-end (i.e. without implementation of PEP interfaces between the network and the terminals) MP-TCP link, with optimal parameterization, between a transmitter terminal and a receiver terminal.

On the graph of FIG. 7, the hatched portions of the bar graphs 711, 712 and 713 indicate the performances, taken as a reference, of a TCP connection on a bidirectional link (terrestrial link type) of 1 Mbits/s, and the rasterized portions of the same bar graphs indicate a connection on a bidirectional link (satellite type) of 5 Mbps. The abscissa shows the size of the message.

The bar graphs 714, 715 and 716, which are neither hatched nor rasterized, correspond to a hybrid link implementing the method according to the invention in an MPTCP hybrid environment, with a bidirectional 1 Mbits/s terrestrial link and a unidirectional 5 Mbits/s satellite link, the mechanism for asymmetrically routing the acknowledgement information according to the invention being activated.

It is able to be seen, by way of the graph of FIG. 7, through this particular example, that the method according to the invention makes it possible to largely pool the two resources and to use the resources of the two systems and that, as long as the message is large enough, typically more than 5 megabytes, virtually optimal performances are obtained, which are substantially equivalent to the utilization of two bidirectional channels, with respect to the available resources.

The invention claimed is:
1. A method for exchanging data flows between two terminals, a server terminal providing data to a client terminal, by way of a multipath link formed of a plurality of transmission channels, at least one of which being a unidi- rectional channel without any return path, a data flow containing data transmitted from the server terminal to the client terminal and also acknowledgement information transmitted in a same flow from the client terminal to the server terminal, said method implementing:

an interface module dedicated to transmitting the data forming said data flow, said transmission interface module being configured to separate said data flow into a plurality of secondary data flows and to transmit said secondary data flows via said plurality of transmission channels forming the multipath link, and an interface module dedicated to receiving said data flow, said reception interface module being configured to receive the data forming the secondary data flows transmitted via said plurality of transmission channels and the multipath link to reassemble said secondary data flows into a single data flow;

wherein said transmission interface module is configured to provide an 'asymmetric routing' function that (i) makes it possible to manage the routing, via a bidirectional channel, of the acknowledgement information accompanying data packets forming a secondary data flow intended to be transmitted via a unidirectional channel and that (ii) marks the acknowledgement information before integrating the secondary data flow into a bidirectional data flow, and wherein said reception interface module is configured to provide an 'asymmetric routing' function that identifies the marked acknowledgement information and re-associates this information with the data forming the secondary data flow that has been transmitted via the corresponding unidirectional channel.

2. The method according to claim 1, wherein, with a protocol for exchanging the data between the two terminals being a transmission control protocol (TCP) protocol, each interface module is configured to provide:

a TCP interface function that manages the data flow exchanges with the terminal under consideration; and a TCP/multipath-TCP (MP-TCP) adaptation function configured to perform a TCP/MP-TCP interface that makes it possible to transmit a TCP data flow under consideration via the multipath link, in the form of secondary data flows, each secondary flow being in accordance with a MP-TCP protocol.

3. The method according to claim 1, wherein said interface modules are integrated into performance enhancement proxy (PEP) servers, located at an output of the terminals under consideration and responsible for managing and optimizing a throughput of the exchanged data so as to avoid saturation of the multipath link and a recurrent loss of the data packets.

4. The method according to claim 2, wherein, with the 'TCP interface' and 'TCP/MP-TCP adaptation' functions of the interface module in transmission mode being integrated into a performance enhancement proxy (PEP) server located at an output of the server terminal and the 'TCP interface' and 'MP-TCP/TCP adaptation' functions of the interface module in reception mode being integrated into a PEP server located at an output of the client terminal, the respective 'asymmetric routing' functions are situated in additional interface machines of router or switch type that are located at an output of the PEP servers.

5. An implementation of the method according to claim 1 in order to exchange the data flows between the two terminals, by way of the multipath link formed of a plurality of satellite transmission channels at least one of the channels of which is a unidirectional channel providing links of broadcast type.

* * * * *